Figure 1:
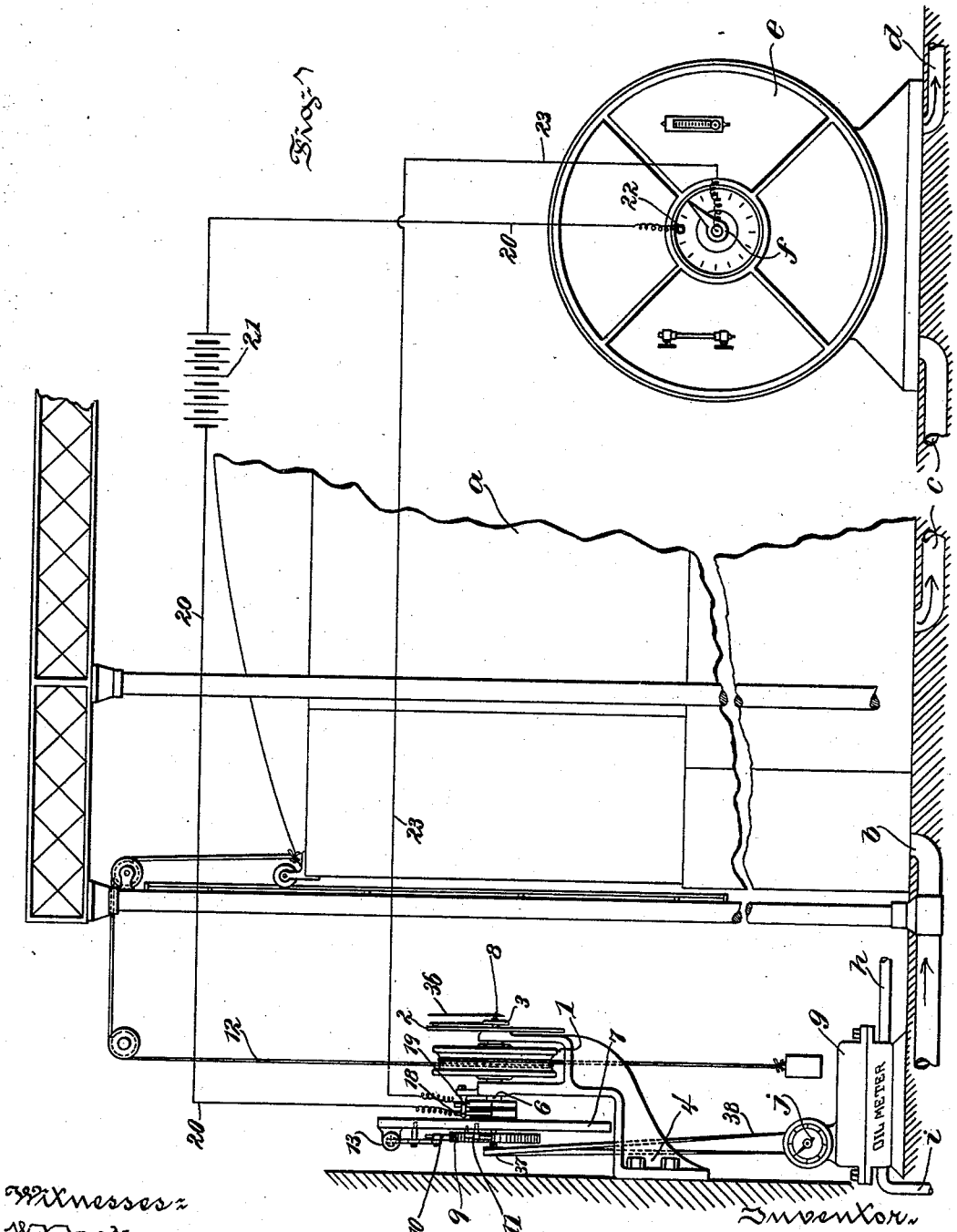

(No Model.) 3 Sheets—Sheet 1.

R. NORRIS.
DIFFERENTIAL INDICATOR FOR GAS APPARATUS.

No. 572,366. Patented Dec. 1, 1896.

Witnesses:
W. J. Jackson.
K. M. Gilligan.

Inventor.
Rollin Norris.
By Augustus B. Stoughton
Attorney.

(No Model.) 3 Sheets—Sheet 2.

R. NORRIS.
DIFFERENTIAL INDICATOR FOR GAS APPARATUS.

No. 572,366. Patented Dec. 1, 1896.

Witnesses:
W. S. Jackson.
K. M. Gilligan.

Inventor:
Rollin Norris.
By Augustus B. Stoughton
Attorney

THE NORRIS PETERS CO., PHOTO-LITHO., WASHINGTON, D. C.

(No Model.) 3 Sheets—Sheet 3.
R. NORRIS.
DIFFERENTIAL INDICATOR FOR GAS APPARATUS.
No. 572,366. Patented Dec. 1, 1896.
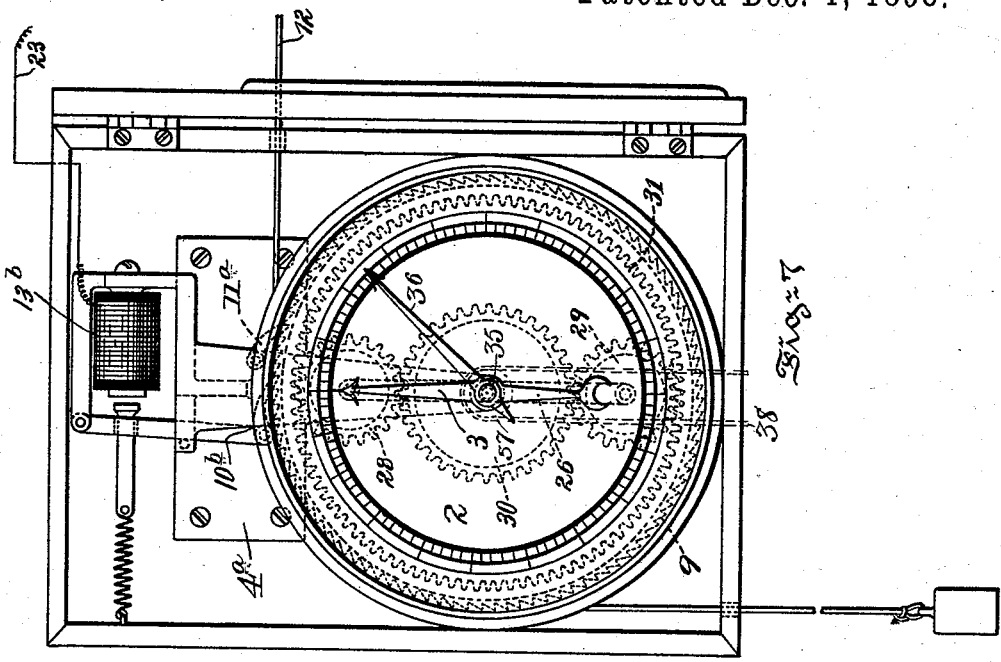
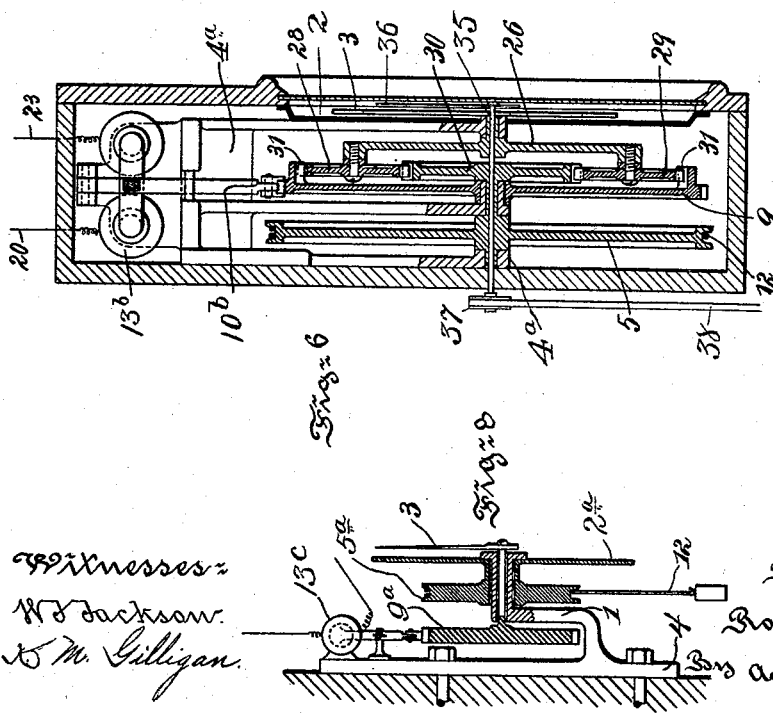
Witnesses:
W. S. Jackson.
N. M. Gilligan.
Inventor.
Rollin Norris.
By Augustus B. Stoughton
Attorney.

UNITED STATES PATENT OFFICE.

ROLLIN NORRIS, OF PHILADELPHIA, PENNSYLVANIA, ASSIGNOR TO THE UNITED GAS IMPROVEMENT COMPANY, OF SAME PLACE.

DIFFERENTIAL INDICATOR FOR GAS APPARATUS.

SPECIFICATION forming part of Letters Patent No. 572,366, dated December 1, 1896.

Application filed April 13, 1896. Serial No. 587,314. (No model.)

*To all whom it may concern:*

Be it known that I, ROLLIN NORRIS, a citizen of the United States, residing at the city of Philadelphia, in the county of Philadelphia and State of Pennsylvania, have invented a certain new and useful Differential Indicator for Gas Apparatus, of which the following is a specification.

Frequently the volume of illuminating-gas generated during equal periods is not the same, and in many instances the generation of gas is intermittent. For convenience the gas as generated is delivered into a relief-holder and is withdrawn therefrom at a substantially uniform rate through a station-meter, for example, by means of a pump. Under these circumstances and in order to ascertain the quantity of gas generated during any given period it is necessary to refer not only to the station-meter, but also to the relative position or height of the relief-holder, and this operation is troublesome, requires time and care, and involves some calculation. In practice many illuminating-gases are enriched by the addition of oil, and it is of course desirable that a constant quantity of oil should be introduced for each unit of volume of gas, in order that the quality of the gas may be uniform and waste of oil obviated.

The principal objects of my present invention are, first, to provide an indicator which may be located conveniently for the attendant in charge and which will indicate at a glance the volume of gas generated during any period, and, second, to combine with such indicator means for showing whether or not the desired quantity of oil is added per unit of volume of gas generated.

My invention consists of the improvements hereinafter described and claimed.

In my invention use is made of apparatus, means, or mechanism by which the rise and fall of the relief-holder and the advance of the station gas-meter are communicated to, for example, the generating-floor and made to operate the pointer of a dial in such manner that it is advanced by the advance of the station-meter and moved backward by the fall and forward by the rise of the relief-holder, the net effect of the two motions being to show the amount of gas made during any period. The oil-meter may also be geared to a second hand moving on the same dial, so that when a predetermined amount of oil per unit of volume of gas is added the gas and oil hands move together. In this way the amount of oil per unit of volume may be kept constant, and at any time a glance will show whether the amount of oil admitted up to that time is greater or less than desired.

I will now proceed to describe the best means known to me at the present time for carrying my invention into effect, and in this connection reference is to be had to the accompanying drawings, in which—

Figure 2:
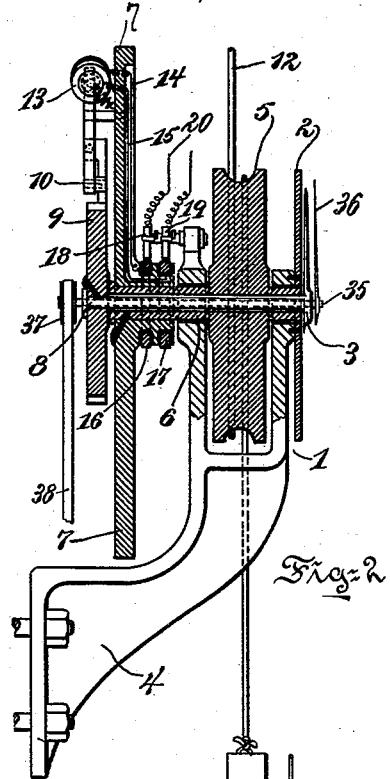
Figure 3:
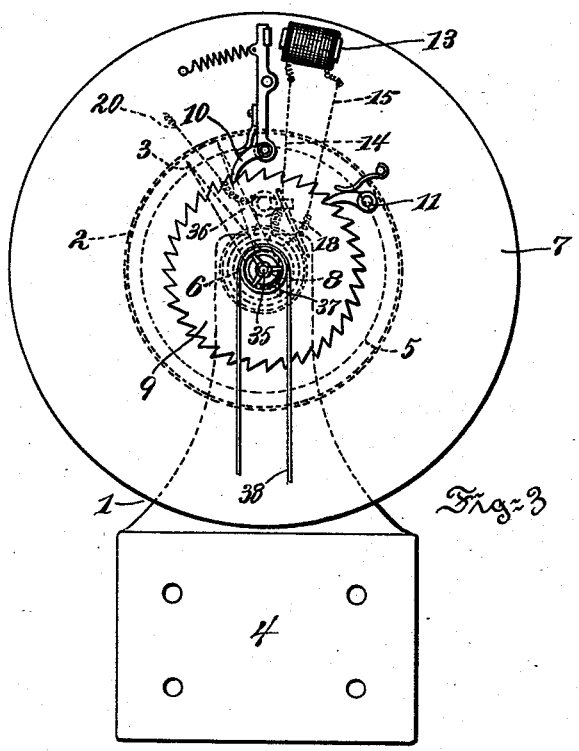
Figure 4:
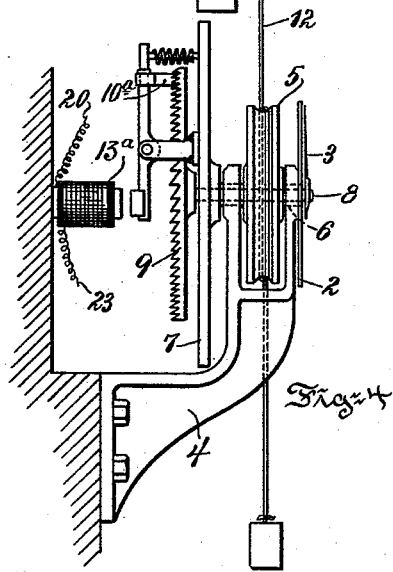
Figure 5:
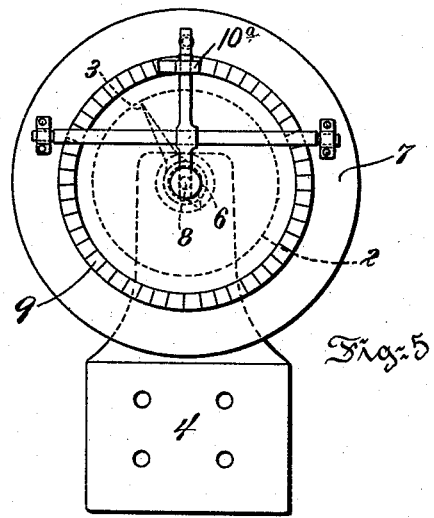

Figure 1 is a diagrammatic view illustrating features of my invention and showing a relief-holder, a gas-meter, an oil-meter, an indicator, and mechanism for connecting these parts. Figs. 2 and 3 are respectively central sectional and rear elevational views of the indicator illustrated in Fig. 1. Figs. 4 and 5 are side and rear elevational views of an indicator having a modified arrangement of electromagnet and its accessories. Figs. 6 and 7 are central sectional and front views of an indicator embodying a modification of my invention, and Fig. 8 is a central sectional view of an indicator embodying another modification of my invention.

In the drawings, $a$ is a relief-holder into which gas is made by way of a pipe or conduit $b$ from a generator, and for the sake of description it will be assumed that gas is introduced by way of this conduit $b$ into the relief-holder $a$ from an ordinary Lowe set. In such case, of course, gas is introduced into the holder $a$ during the run and not during the blow, or, in other words, intermittently. From the relief-holder $a$ gas is constantly drawn or pumped by way of the conduits $c$ and $d$ through the gas-meter $e$, which is provided with a pointer $f$, that indicates the volume of gas which passes through the meter $e$.

$g$ is an oil-meter through which the oil that is used for enriching the gas may be caused to pass by way of the pipes $h$ and $i$ and which is provided with a pointer $j$, that indicates the quantity of oil which passes through the meter.

$l$ is a differential indicator embodying features of my invention and preferably located at some point convenient to the attendant in charge. Referring to the drawings and more particularly to Figs. 1, 2, and 3, this differential indicator comprises a fixed dial 2, a gas-hand 3, and a support or bracket 4.

5 is a pulley formed integral with or pinned or otherwise connected to a revoluble sleeve 6 and a disk 7. Within the sleeve 6 is mounted so as to turn therein a spindle 8, to one end of which the gas-hand 3 is secured and to the other end of which a ratchet-wheel 9 is secured, so that the parts 3, 8, and 9 constitute in effect one piece. The disk 7 carries a pawl 10 for driving the ratchet-wheel 9, and it may also carry a detent 11 for preventing retrograde movement of the ratchet-wheel. Motion is transmitted to the pulley 5 from the relief-holder $a$ by way, for example, of a cord, band, belt, or equivalent device 12, and the advancing motion of the pointer $f$ of the gas-meter $e$ is imparted to the ratchet-wheel 9. In the embodiment of my invention shown in the drawings electricity is availed of for this purpose.

13 is an electromagnet mounted, Figs. 1, 2, and 3, on the disk 7 and having its armature mounted on the arm of the pawl 10. From the electromagnet 13 insulated wires 14 and 15 are electrically connected with insulated rings 16 and 17, upon which bear brushes 18 and 19. From the brush 18 a conductor 20 leads through a battery 21 to an insulated contact 22 in range of the index or pointer of the gas-meter. From the brush 19 a conductor 23 leads to the pointer $f$, which is suitably insulated. When the pointer $f$ makes a revolution, it completes the circuit above described by way of the insulated contact 22, and thus energizes the magnet 13, which attracts its armature and causes the pawl 10 to drive the ratchet-wheel 9 and spindle 8, so that the gas-hand 3 is advanced in respect to the dial 2. When the relief-holder $a$ falls, it tends to turn the parts 5, 6, and 7, and with them the parts 10, 9, and 8, backward, so that the gas-hand 3 is turned backward, and when the relief-holder rises it tends to turn the parts mentioned forward.

In Figs. 4 and 5 the electromagnet $13^a$ is fixed and the pawl $10^a$ is adapted for coöperation with ratchet-teeth arranged like the teeth of a crown-wheel on the part 9. By this arrangement the brushes and their accessories may be dispensed with and the circuit-conductors 20 and 23 are connected directly with the electromagnet, which is fixed.

In Figs. 6 and 7 the gas-hand 3 is connected with or made part of an arm 26. The arm 26 is provided at its ends with toothed wheels 28 and 29. The drum or pulley 5 is provided with a toothed wheel 30, that turns with it and meshes with the toothed wheels 28 and 29. The parts 5 and 30, 26 and 3, which constitute in effect one piece, are free to turn in suitable bearings depending from the support $4^a$. The ratchet-wheel 9 is provided internally upon its rim with teeth 31, that mesh with the toothed wheels 28 and 29. The electromagnet $13^b$ and its pawl $10^b$ and detent $11^a$ serve to operate the ratchet-wheel 9. The advance of the pointer of the gas-meter energizes the electromagnet $13^b$ and causes its pawl $10^b$ to advance the gas-hand 3, through the intervention of the teeth 31, toothed wheels 28 and 29, and arm 26. The fall of the relief-holder $a$ turns the pulley 5 and toothed wheel 30, which operates upon the toothed wheels 28 and 29 and arm 26, and thus causes the gas-hand to be moved backward. The rise of the relief-holder turns the gas-hand forward in a similar manner. If desired, an arbor 35 may be mounted so as to turn within the spindle of the gas-hand, as shown in Figs. 2 and 3. One end of this arbor 35 is provided with an oil-hand 36 and the other end is connected with the pointer-shaft of the oil-meter $g$, for example, by means of a pulley 37 and belt 38.

The mode of operation of apparatus embodying features of my invention may be described as follows: The various parts are constructed, proportioned, and designed in such manner that as the station-meter index advances and the relief-holder falls, for example, when the gas is being withdrawn by way of the conduit $d$, and no gas is being generated for admission by way of the conduit $b$, the relief-holder will operate by way of the connection 12 and its connected parts to tend to move the gas-hand backward as much as the station-meter index tends to advance it by reason of the described connections from said index to the spindle 8. The net result of this differential action will be that the gas-hand will stand still (except for slight vibration) as long as no gas is being made into the relief-holder. When, however, gas is made into the relief-holder by way, for example, of the pipe $b$, the net effect of the two described motions imparted to the gas-hand by the rise and fall of the relief-holder and the advance of the index of the gas-meter is to show the amount of gas made during any period. If the amount of gas generated into the relief-holder equals the amount of gas pumped from it, the relief-holder will stand still and the gas-hand of the indicator will correspond with the gas - meter index or pointer. If more gas is pumped out of the relief-holder than is supplied to it, the relief-holder will fall and will turn the indicator-hand backward from the position which it would occupy if operated only by the station-meter. If less gas is pumped out of the relief-holder than is supplied to it, the relief-holder will rise and thus turn the indicator-hand forward farther than it would be turned by the station gas-meter. The described motions are imparted to the hand more or less simultaneously, so that its position at the time of observation depends upon their net result, as has been set forth. The oil-hand 36 is so connected, for example, by proportioning the size of the pulley 37 and pulley on the oil-meter counter-shaft, that its angular advance for a desired amount of oil per unit of gas will equal the angular advance of the gas-hand 3 for each unit of gas made. Consequently the attendant in charge may by reference to the hands ascertain whether or not the amount of oil admitted during any period is greater or less than desired and may thereupon control the oil supply accordingly. When it is desired to alter the quantity of oil per unit of gas, the pulley 37 may be replaced by another of correspondingly different size, so as to keep equal the angular advance of the gas-hand for each unit of gas made and of the oil-hand for the desired quantity of oil introduced per unit of gas made.

In Fig. 8 I have illustrated an obvious modification of my invention, in which the dial $2^a$ is attached to the pulley $5^a$, that is connected with the holder $a$, in the manner described, and in which the gas-hand 3 is advanced by means of the ratchet-wheel $9^a$, electromagnet $13^c$, and described connections to the gas-meter. The net effect of the motions of the dial and gas-hand is to show the quantity of gas delivered during any period, as has been hereinabove set forth.

It will be obvious to those skilled in the art to which my invention relates that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. In combination an indicator, a relief-holder, connections between the relief-holder and indicator for turning it forward and backward according as the relief-holder rises and falls, a gas-meter, and connections between the gas-meter and indicator for turning it forward, for the purposes set forth.

2. In combination an indicator, a pulley adapted to respond to the rise and fall of a relief-holder and operating to turn the indicator through the intervention of a toothed wheel, and a pawl adapted to respond to the advance of a gas-meter and operating to turn said toothed wheel, substantially as described.

3. In combination a gas-hand, a relief-holder, a gas-meter, and mechanism substantially as described interposed between said holder and meter and gas-hand for causing the latter to indicate the volume of gas delivered, an oil-meter, an oil-hand, and connections between the oil-meter and oil-hand, for the purposes set forth.

4. In combination a gas-hand provided with an arm carrying toothed wheels, a ratchet-wheel provided with teeth meshing with said toothed wheels, a pulley provided with a toothed wheel 30, meshing with said toothed wheels, and a pawl for said ratchet-wheel, substantially as described.

5. In combination a gas-hand provided with a toothed wheel, a pulley, mechanism for imparting motion from the pulley to the toothed wheel, and means for turning the toothed wheel independent of the pulley, substantially as described.

In testimony whereof I have hereunto signed my name in the presence of two witnesses.

ROLLIN NORRIS.

Witnesses:
GEORGE S. PHILLER,
F. H. MACMORRIS.